No. 621,684. Patented Mar. 21, 1899.
A. S. KROTZ.
MOTOR CYCLE.
(Application filed Mar. 9, 1897.)
(No Model.) 2 Sheets—Sheet 2.
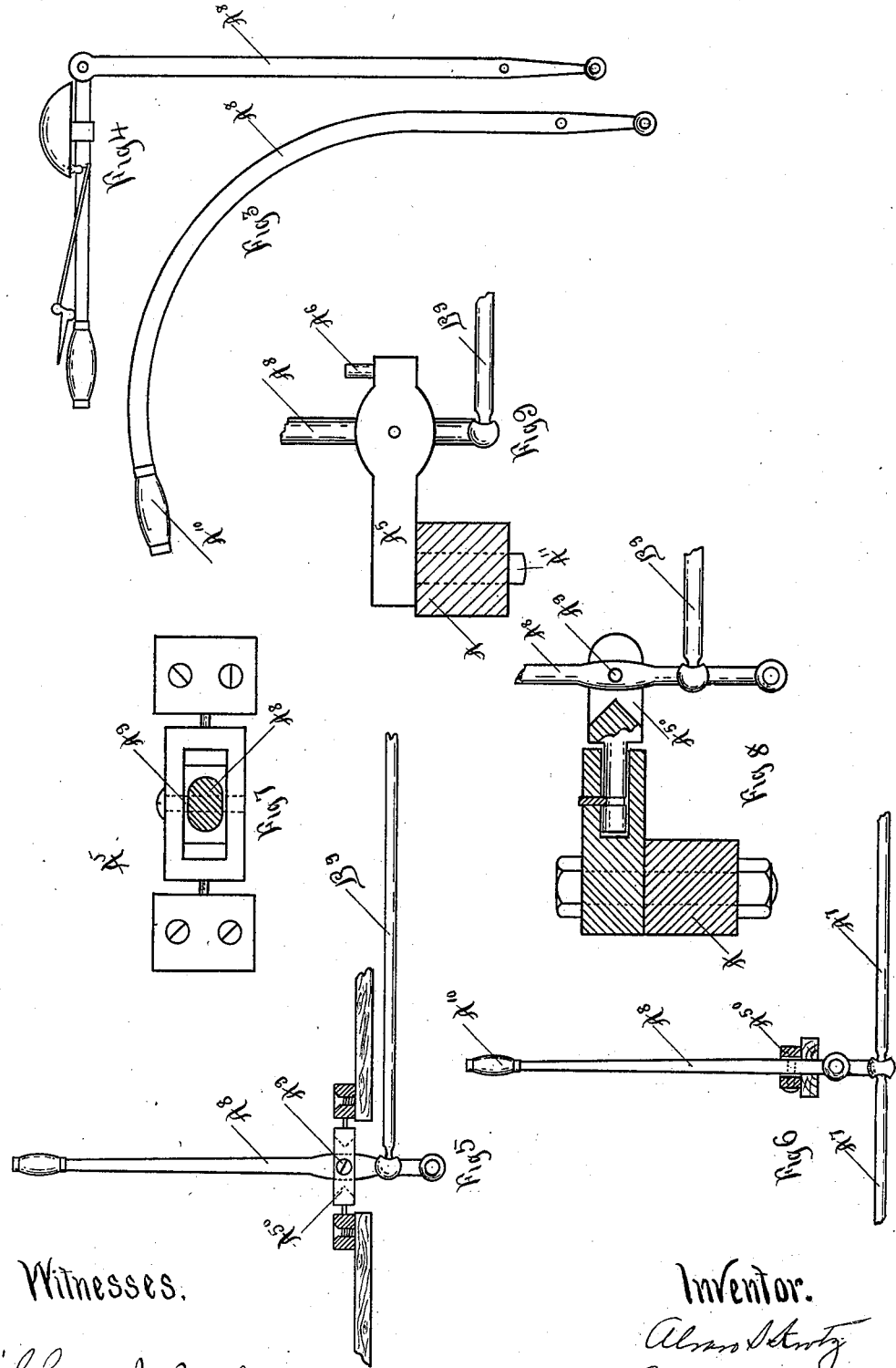
Witnesses.
Chas. I. Welch
G. M. Gridley
Inventor.
Alvan S. Krotz

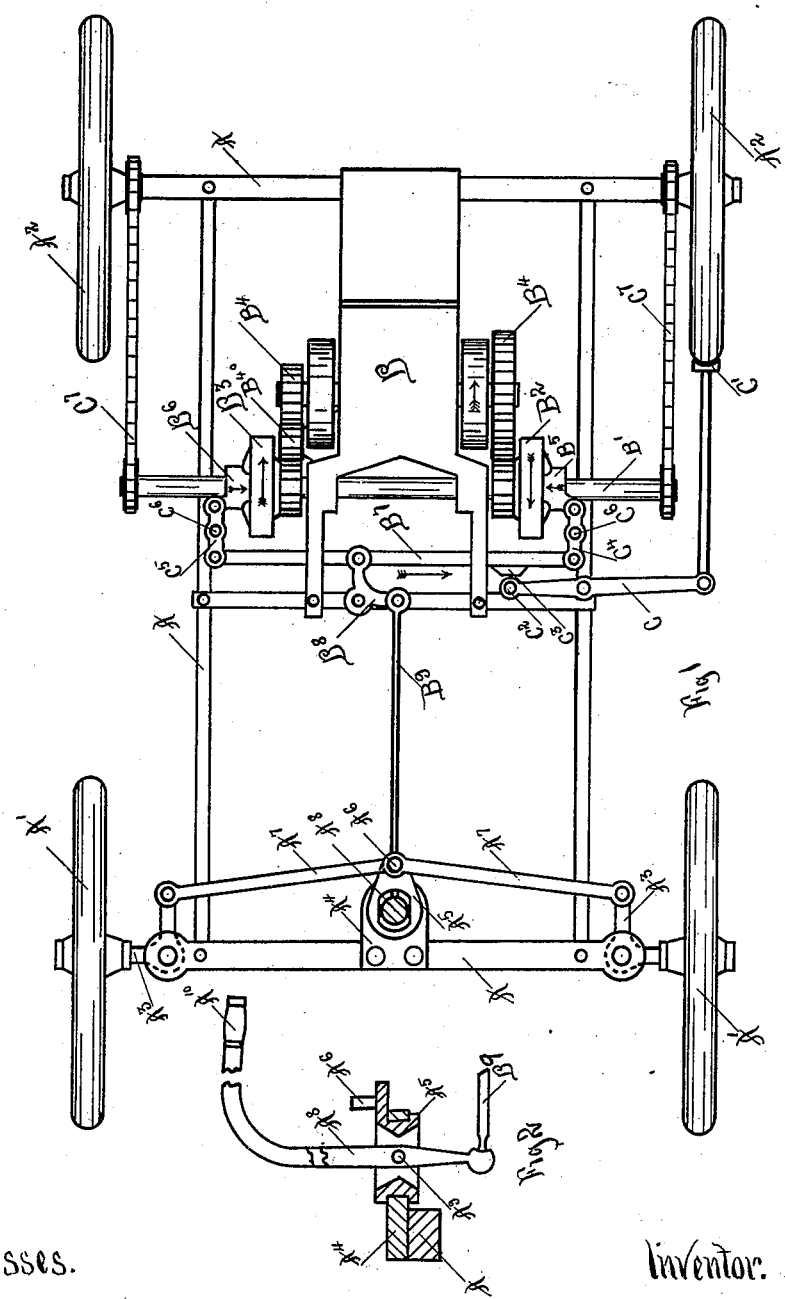

UNITED STATES PATENT OFFICE.

ALVARO S. KROTZ, OF SPRINGFIELD, OHIO, ASSIGNOR OF TWO-THIRDS TO O. S. KELLY AND O. W. KELLY, OF SAME PLACE.

MOTOR-CYCLE.

SPECIFICATION forming part of Letters Patent No. 621,684, dated March 21, 1899.

Application filed March 9, 1897. Serial No. 626,675. (No model.)

*To all whom it may concern:*

Be it known that I, ALVARO S. KROTZ, a citizen of the United States, residing at Springfield, in the county of Clark and State of Ohio, have invented certain new and useful Improvements in Motor-Cycles or Horseless Vehicles, of which the following is a specification.

My invention relates to improvements in motor-cycles or horseless vehicles, and it particularly relates to the means for guiding and controlling said vehicles.

My invention consists in the constructions and combinations of parts hereinafter described, and set forth in the claims.

In the accompanying drawings, Figure 1 is a plan view of the running-gear of a motor-cycle or horseless vehicle embodying my invention. Fig. 2 is a detail view, partly in section, of a portion of the steering mechanism. Figs. 3 and 4 are details of the same, showing modifications. Figs. 5 to 9, inclusive, are detail views of the steering devices or portions thereof, showing further modifications.

Like parts are represented by similar letters of reference in the several views.

In the said drawings, $a\,a$ represent the running-gear frame, including the axles.

$a'$ and $a^2$ represent the steering and driving wheels, respectively. The steering-wheels $a'$ are mounted on short axles $a^3$, which are pivoted to the main axle, as shown, and formed in the nature of bell-cranks, to one end of which are pivoted connecting-links $a^7$. These connecting-links $a^7$ are attached through intermediate connections to a controlling-lever $a^8$, provided with a handle $a^{10}$ and pivotally mounted in a rotating head, so that the lever or handle is capable of a double motion—that is to say, a lateral motion as well as a rear motion. In Figs. 1 and 2 I have shown this connection formed as follows: The controlling-lever $a^8$ is pivoted at $a^9$ within a rotating head $a^5$, which is journaled in a bearing-support $a^4$, connected to the main frame or axle $a$, the construction being such that the rotating head $a^5$ can turn freely in the bearing-support $a^4$. This rotating head $a^5$ is provided with a stud $a^6$, and on this stud is journaled one end of the link connections $a^7$, said links being connected at the other end to the bell-crank axles $a^3$, the construction being such that as the handle $a^{10}$ is moved laterally the rotating head $a^5$ is turned in its support $a^4$, and thus through the intermediate connections $a^7$ turns the steering-wheels to change direction.

The power to drive the traction-wheels $a^2$ is furnished from any suitable motor $b$, which is geared at each end to clutch-collars $b^2\,b^3$, arranged on a counter-shaft $b'$, the gear being such that the respective clutch-collars $b^2\,b^3$ turn in opposite directions. There are mounted on the shaft $b^2$ movable collars $b^5\,b^6$, which are adapted to operate in connection with the clutches to cause said clutches to engage or disengage said shaft $b'$ and cause said shaft to revolve therewith or permit said clutches to run freely on said shaft in a well-known manner. These movable collars $b^5\,b^6$ are pivoted to one end of levers $c^4\,c^5$, which are pivoted at $c^6$ to the main frame and are connected together by a link $b^7$. This link $b^7$ is in turn connected near its center to a bell-crank lever $b^8$, also pivoted to the main frame, the other arm of which bell-crank lever is connected by a link $b^9$ to the controlling-lever $a^8$, preferably by means of a universal joint which will permit a lateral movement of the controlling-lever without cramping the connection with the link $b^9$.

It will be seen by the construction thus described that as the handle $a^{10}$ is moved laterally the rotating head will be moved thereby, and through the link connections $a^7$ the steering-wheels will be correspondingly moved to change direction. If the handle-lever $a^{10}$ be moved forward or back, the link $b^9$ will be correspondingly operated, which in turn, through the bell-crank lever $b^8$, connection $b^7$, and pivoted levers $c^4\,c^5$, will operate the clutches $b^5\,b^6$, so as to throw one out and the other in, or when in a normal position to throw both clutches out. This will cause the shaft $b'$ to rotate in either a forward or backward direction or remain stationary, depending on the position of the clutch-collars. The shaft $b'$ is connected by suitable chains or other gearing $c^7$ to the driving-wheels $a^2$, so that as the shaft revolves the driving or traction wheels are correspondingly revolved.

In Figs. 5 and 7 I have shown the rotating head $a^5$ as mounted on trunnions, and in this case the link connections $a^7$ and $b^9$ are both connected by universal jointed connections to the lever $a^8$, but in planes at right angles to each other.

In Figs. 6 and 8 the rotating head $a^5$ is provided with a single trunnion. The connections $a^7$ and $b^9$ are both formed with the handle $a^8$, substantially as in Figs. 5 and 7.

In Fig. 9 the rotating head $a^5$ instead of being journaled in a supporting-ring is provided with a downwardly-projecting pin or trunnion $a^{11}$, which is journaled in the axle or frame $a$, the connections $a^7$ being in this case connected to the stud $a^6$ in the rotating head $a^5$, as in the constructions shown in Figs. 1 and 2.

In either case it will be seen that by a lateral movement of the controlling-handle the steering-wheels will be changed to change the direction of the vehicle, while the front and rear motion of the handle will produce a corresponding change in the driving devices, which will cause the device to run either forward or backward or remain stationary, depending upon the position of the lever. The clutches and connections may be of such a type that more or less movement of the lever will also produce a corresponding change in the speed.

I also preferably provide means by which when the clutches are in the normal position—that is, when both are out of gear with the shaft $b'$—a brake will be applied to one or both of the driving-wheels. I have shown this accomplished as follows: A pivoted lever $c$, pivoted to the main frame, is connected by a suitable link connection to a brake-shoe $c'$. This lever $c$ is provided at one end with a friction-roller $c^2$, adapted to be engaged by a cam projection $c^3$ on the reciprocating link connection $b^7$, which connects the clutch-levers, so that when in the normal position—that is to say, when the clutches are both disengaged—then the cam projection $c^2$ will be brought into contact with the end of the lever $c$, and thus apply the brake. As the connecting link or bar is moved in either direction to engage one of the clutches then the cam projection will be moved away from the end of the lever $c^2$, and thus release the brake from the driving-wheel.

It will be seen that by the above description I provide simple and effective devices by which all movements of the vehicle or motor-cycle may be readily controlled by a single operating-lever.

In Figs. 3 and 4 I have shown the controlling-lever $a^8$ constructed with the handle $a^{10}$ in a plane at right angles to the lever proper, the lever in Fig. 3 being formed rigid and bent or curved to secure this result, while in Fig. 4 the lever is made in two parts hinged together, so that the handle portion may be adjusted to different angular positions with reference to the main portion $a^8$. This construction is desirable under certain conditions of use, as it brings the lever in more convenient positions for the operator.

Having thus described my invention, I claim—

1. In a motor-cycle, a steering wheel or wheels, a motor, and a propelling mechanism, and devices for regulating and controlling the propelling mechanism, a controlling-lever pivotally mounted in a rotating head and connected with said steering wheel or wheels, said lever also having a connection with the controlling devices of the propelling mechanism adapted in its normal position to hold said controlling devices disconnected from said motor, one of said devices being adapted to be connected to motor when the lever is oscillated in said head and the other device being operated when the lever oscillates the head, substantially as and for the purpose specified.

2. The combination with the steering and driving devices, as described, of a controlling-lever pivoted in a rotating head, link connections extending in opposite directions to the steering-wheels from said lever and adapted to be moved by a lateral movement of said lever, and clutch devices forming part of the driving mechanism also connected by a link connection to said operating or controlling lever and adapted to be moved by a front and rear motion of said lever, substantially as specified.

3. The combination with the driving mechanism and the steering-wheels, of a controlling-lever pivotally mounted in a rotating head, link connections extending laterally and rearwardly from said lever and connected respectively to the guiding and driving mechanism of the vehicle, said link connections being universally joined to said lever to permit a lateral or front and rear motion of said lever without interfering with said connections, substantially as and for the purpose specified.

4. The combination with the driving-wheels, of a counter-shaft, clutches mounted on said counter-shaft, and a motor geared to said clutches to cause the same to rotate in opposite directions on said shaft, and means, substantially as described, to cause said clutches to engage or disengage said shaft, a controlling-lever mounted in a rotating head and connected by intermediate connections to said clutches, said controlling-lever being also connected to the steering device of the vehicle, substantially as and for the purpose specified.

5. The combination with a driving-shaft and the clutches thereon, a vibrating bar connected to said clutches, and a pivoted lever connected by intermediate connections to said bar, a brake-lever pivoted adjacent to said bar, and a cam projection adapted to engage said brake-lever, and a connection from said brake-lever to a brake-shoe to cause said brake to be operated when said bar is in a normal or neutral position and to disengage said brake when said bar is moved in either direction from said position, substantially as specified.

6. In a motor-cycle, the steering-wheels and driving mechanism, a controlling-lever pivotally mounted in a rotating head, said lever being formed with a handle substantially at right angles to the main body of the lever, a connection from the rotating head to the steering-wheels, and a connection from the lever to the driving mechanism, substantially as and for the purpose specified.

7. The combination with the steering and the driving mechanism, of a rotating head journaled in a suitable support, a controlling-lever pivotally mounted in said rotating head, said lever being adapted to turn on its pivoted bearings and also to turn said head, a connection from said head to the steering device, and a connection from said lever to the driving mechanism whereby a movement of said lever in one direction will operate one of said devices and a movement of the lever in a different direction will operate the other device, substantially as specified.

8. The combination with the steering-wheels and driving mechanism, of a head journaled in a suitable support, and a controlling-lever pivoted to said head, a connection from said lever to one of said driving or steering devices, and a connection from said rotating head to the other device, said lever having an upper hinged portion to permit the handle portion to assume different angles with reference to the main portion of said lever, substantially as specified.

9. The combination with a steering wheel or wheels and motor, driving wheel or wheels and connections, and means for regulating and controlling the driving mechanism, of a controlling-lever adapted to control the devices connecting the motor and driving-wheel, one end of which is mounted in a universal jointed connection to permit said lever to oscillate in any direction, and connections from said lever extending substantially at right angles to each other, one of said connections leading to the steering wheel or wheels and the other to the controlling devices of the driving mechanism, substantially as and for the purpose specified.

In testimony whereof I have hereunto set my hand this 11th day of February, A. D. 1897.

ALVARO S. KROTZ.

Witnesses:
CHAS. I. WELCH,
G. M. GRIDLEY.